July 3, 1962
R. B. MACIEJCZAK
3,042,226
BILLET TURNER
Filed Nov. 7, 1958
4 Sheets-Sheet 1
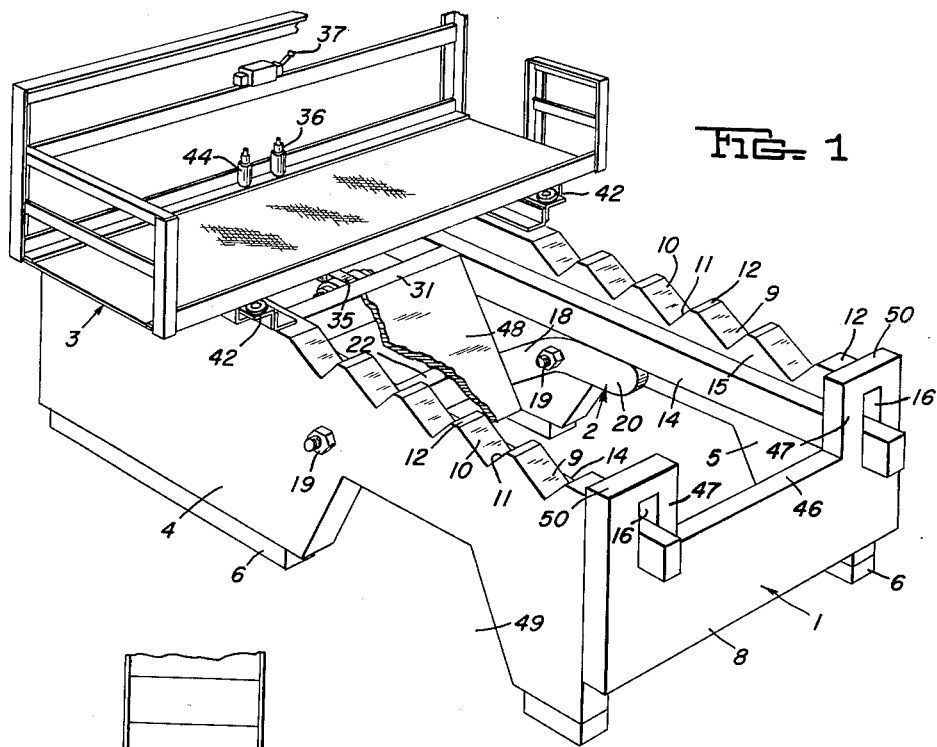
INVENTOR
ROBERT B. MACIEJCZAK
By Donald G. Dalton
Attorney July 3, 1962 R. B. MACIEJCZAK 3,042,226
BILLET TURNER
Filed Nov. 7, 1958 4 Sheets-Sheet 2

INVENTOR
ROBERT B. MACIEJCZAK
By Donald G. Dalton
Attorney

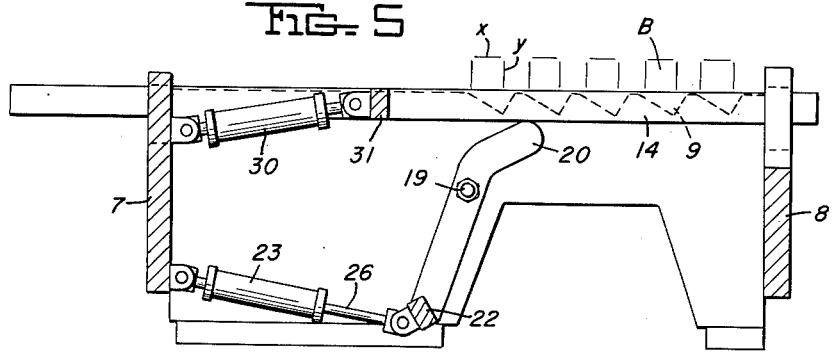
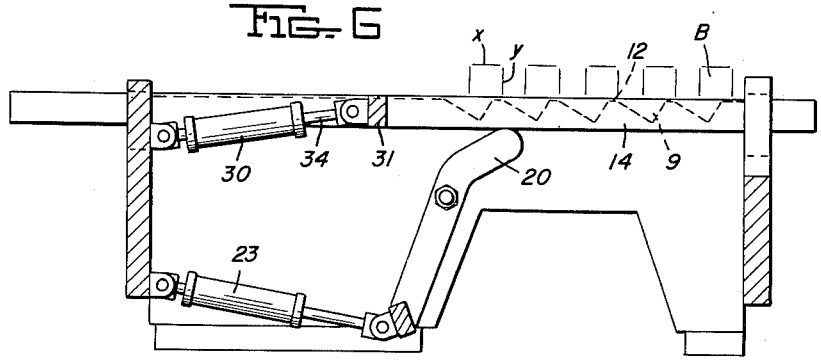
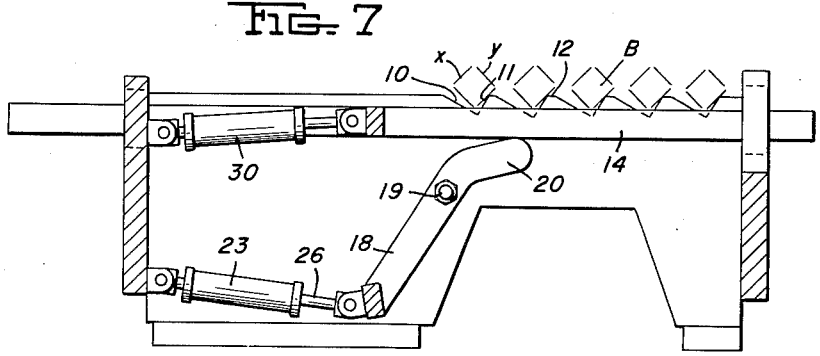

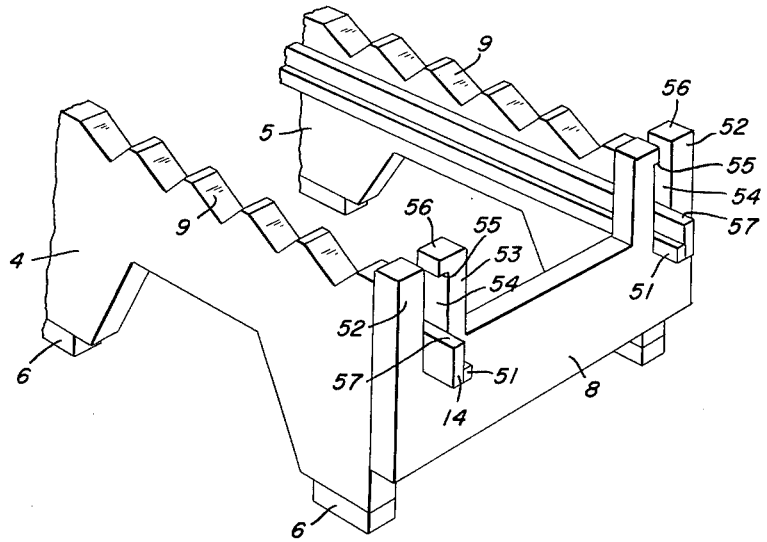
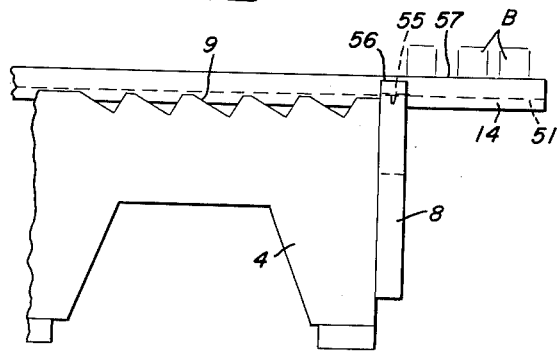

United States Patent Office 3,042,226
Patented July 3, 1962

3,042,226
BILLET TURNER
Robert B. Maciejczak, 4221 W. 45th Ave., Gary, Ind.
Filed Nov. 7, 1958, Ser. No. 772,544
1 Claim. (Cl. 214—1)

This invention relates, as indicated, to a billet turner and, more particularly, to a billet turning apparatus of improved construction that provides for simultaneously handling a plurality of billets.

Blooms and billets produced by rolling ingots to size usually have surface defects, such as seams, scabs, embedded slag particles and the like, that must be removed by scarfing, chipping or grinding before delivery to a reheating furnace for subsequent rolling. This practice requires rotation of each bloom or billet through successive angles of 90° to present its sides to an operator for inspection and marking or removal of surface defects, and for the purpose of eliminating manual operations involved in conventional billet turning procedures various forms of billet turning machines have been proposed. One of the principal objects of this invention is to provide an improved billet turning apparatus of this character.

According to the preferred embodiment shown in the drawings, the apparatus of this invention provides a stationary support with notches or troughs for receiving and positioning billets thereon in parallel canted positions. Rotation of the billets is effected by a lift which is operated to elevate and then lower the billets with respect to their supporting notches, and which further includes means for moving the billets horizontally a short distance between raising and lowering movements thereof to place their lower corners over turning lands arranged between and at one side of each billet positioning notch. In this manner, subsequent lowering movement of the lift operates to engage the billets with the turning lands so that they are rotated through an angle of 90° as they are returned by lowering to the supporting notches or troughs from which they were initially removed.

Other objects and advantages of the invention will become apparent from the following description and the accompanying drawings in which:

FIGURE 1 is a perspective view of a billet turning apparatus constructed in accordance with the principles of this invention;

FIGURE 2 is a plan view of the apparatus shown in FIGURE 1;

FIGURES 5–7 are views similar to FIGURE 4 which respectively illustrate sequential operating positions through which the apparatus moves in turning each billet through an angle of 90°; and FIGURES 8 and 9 are fragmentary perspective and side elevational views of a modification.

Figure 3:
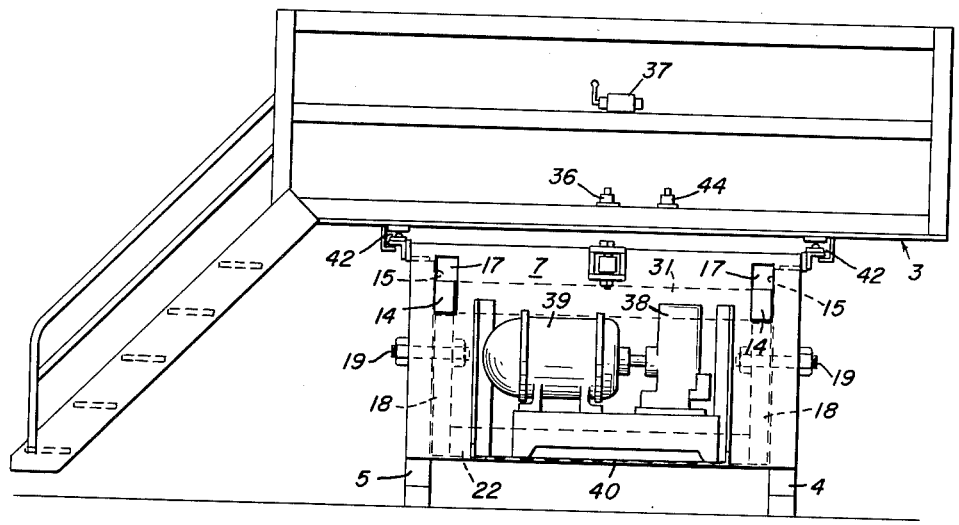
FIGURE 3 is an end view looking from the left of FIGURE 2.

Generally stated, the apparatus of this invention as best shown in FIGURE 1 of the drawings comprises a support or base 1 on which billets having a square cross-sectional contour are placed and removed by a fork lift truck in a manner to be described, an elevator mechanism 2 for manipulating the billets to effect their rotation on the support 1, and a platform 3 on which an operator may stand while inspecting or scarfing the billet side surfaces.

The base 1 is fabricated from vertical slabs that are welded together and form a rectangular enclosure for the elevator mechanism 2. It comprises vertical side slabs 4 and 5 supported on runners 6 and end slabs 7 and 8 extending transversely of and welded to the ends of the side slabs 4 and 5. The upper edge of each of the side slabs 4 and 5 is provided with notches or troughs 9 at spaced intervals along the length thereof in which billets B are received as shown diagrammatically in FIGURE 4, the notches 9 being arranged in laterally aligned pairs so that each of the billets B has supporting engagement in a pair of such notches. Each of the notches 9 has a rightangular shape that is defined by billet supporting surfaces 10 and 11, and which preferably has its supporting surface 10 inclined downwardly relative to a horizontal plane at an angle of less than 45° for a purpose to be described. Turning lands 12 separate adjacent notches 9 along the length of each of the sides 4 and 5 and extend horizontally outwardly from the upper edges of their respective surfaces 11. By reason of their location at the upper ends of the surfaces 11, the turning lands 12 are positioned at a vertical level above the billet supporting surfaces 10 and 11 along the upper edges of the slabs 4 and 5, and may therefore be characterized for purposes of definition herein as projecting upwardly from the supports 4 and 5. In order to render the lands 12 effective to rotate billets in a manner to be described, they must be located at a level above the lower end of the side 11 a distance at least equal to one-half the size of the largest billet to be handled by the apparatus.

The billet turning mechanism 2 comprises a pair of bars 14 which are arranged along the inner faces 15 of the side slabs 4 and 5 and are mounted for horizontal and vertical movement thereover. Opposite ends of the bars 14 project through vertically extending slots 16 in the end slabs 8, and similar slots 17 in the end slabs 7, which operate to guide the movement of the bars 14 over the side slab surfaces 15. The bars 14 normally occupy a retracted position in which their upper edges are below the notches 9 and out of engagement with the billets supported therein.

Vertical movement is imparted to the bars 14 by a pair of bell-crank levers 18 which are mounted for rotational movement on the inner faces of the side slabs 4 and 5 by stud shafts 19, there being a lever 18 under each bar 14. The upper ends 20 of the levers 18 have camming engagement with the bars 14 and their lower ends 21 are joined by a cross-bar 22 that provides for their simultaneous rotation. The bell-cranks 18 are rotated by a fluid pressure hydraulic motor 23 which includes a cylinder 24 that has a pivotal connection 25 at one end to the end slab 7 and a piston rod 26 projecting from its other end. The piston rod 26 has a pivotal connection 27 at its outer end to the cross-bar 22 joining the bell-crank ends 21 so that its movement to and from an extended position relative to the cylinder 24 is effective to rotate the bell-cranks 18 about the stud shafts 19. As the piston rod 26 moves to its extended position, the bell-cranks 18 are rotated in a counter-clockwise direction as viewed in the drawings and their upper ends 20 cam the bars 14 upwardly from the retracted position shown in FIGURE 4 to the elevated position shown in FIGURE 5. Retraction of the piston rod 26 rotates the bell-cranks in a clockwise direction to provide for lowering movement of the bars 14 from the positions shown in FIGURES 4 and 5, through the position shown in FIGURE 7, to the retracted position shown in FIGURE 4.

Horizontal movement is imparted to the bars 14 by a fluid pressure hydraulic motor 30 and a cross-bar 31 which has welded connections at its ends to the side bars 14. The motor 30 includes a cylinder 32 which has a pivotal connection 33 at one end to the end slab 7 and a piston rod 34 projecting from its other end. The piston rod 34 has a pivotal connection 35 with the cross-bar 31 so that its movement to and from an extended position with respect to the cylinder 32 is effective to impart horizontal movement to the bars 14.

The hydraulic motors 23 and 30 are preferably double-acting and are provided with the usual conventional reversing connections for admitting and exhausting fluid from opposite ends thereof. A foot operated valve 36 and hand operated valve 37 conveniently located on the platform 3 for actuation by an operator control the respective connections of the motors 23 and 30 to a fluid pressure pump 38 operated by an electric motor 39 carried by a platform 40 secured to the end slab 7.

The platform 3 is mounted for movement in a direction lengthwise of the support 1 by guide rail and roller assemblies 42 extending along the upper edges of the side slabs 4 and 5. Adjustment of its position with respect to the support 1 is effected by a fluid pressure hydraulic motor 43 under the control of a foot operated valve 44 (FIGURE 3) mounted on the platform 3 for movement therewith.

As indicated the apparatus of this invention is adapted for operation in conjunction with fork-lift trucks which are used to place billets on the support 1 and remove them after inspection and scarfing to remove surface defects. For this purpose the end plate 8 has a U-shape to provide an opening 46 between the vertically extending legs 47 in which the guide slots 16 are formed. The opening 46 has a size such that the parallel arms of a conventional fork-lift truck may be moved therethrough between and in a direction parallel to the side slabs 4 and 5 and operated to place billets B on the support 1 in positions straddling the slabs 4 and 5 and to thereafter remove them from the slab 1. After emplacement of billets B on the support 1, they are jogged to positions supported in the notches 9 either by jogging operation of the fork-lift truck arms or the bars 14. The number of billets that may be handled at any time is determined by the number of notches 9 in the side slabs 4 and 5. As shown in the drawings, the slabs 4 and 5 are preferably constructed with five notches 9 to provide for the simultaneous handling of five billets B.

Figure 4:
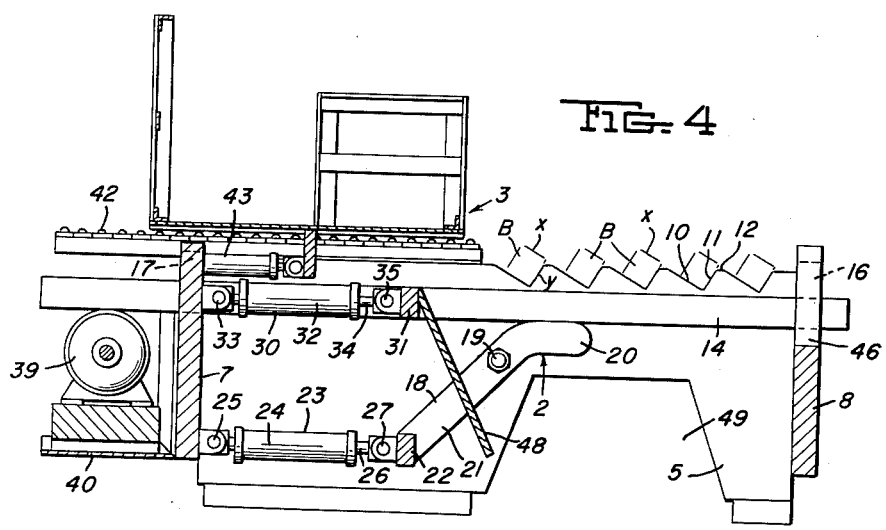
FIGURE 4 is a sectional view taken substantially along the line IV—IV of FIGURE 2.

In operation, billets B are placed on the support 1 and arranged in the notches 9 as shown in FIGURE 4 of the drawings. By reason of the canted positions of the billets B when supported in the notches 9 in this manner, their upper surfaces $x$ are positioned in parallel planes that are respectively inclined downwardly at an angle less than 45° and corresponding to the downward angular inclination of the notch supporting surfaces 10. This inclination of the surfaces $x$ provides for washing each surface $x$ in a downward direction during each pass of a scarfing torch thereover so that the fin formed at the lower edge of each scarfing pass can be transferred downwardly to the lower edge of the surface $x$, and over the corner of the billet to the next side $y$ to be scarfed. While the downward inclination of the surfaces $x$ is desirable from the standpoint of washing the scarfing fin over the surface of the billet in this manner, such inclination should not be steep enough to interfere with inspection of the surfaces $x$ by an operator standing on the platform 3. For this reason, an angular inclination of the supporting surfaces 10 of less than 45°, and preferably one of about 30° as shown in the drawings, is preferred.

After inspection and scarfing of the surface $x$, the apparatus is operated to turn each billet through an angle of 90° and present its surface $y$ for inspection and scarfing. This is accomplished by operating the apparatus to move the billets 3 through the successive positions shown respectively in FIGURES 5 through 7 of the drawings. For this purpose, the fluid pressure motor 23 is first operated to rotate the camming levers 18 in a counterclockwise direction as viewed in the drawings and to move the bars 14 upwardly as described above to positions limited by their engagement in the upper ends of the vertical guide slots 16 and 17, and to the position shown in FIGURE 5. This upward movement of the bars 14 operates to raise the billets B out of their supporting notches 9 and to positions in which they are supported on the bars 14 at a vertical level with their lower surfaces positioned above the turning lands 12. Attention is particularly directed to the fact that the billets B rotate in a counterclockwise direction through an angle corresponding to the downward angular inclination of the notch surfaces 10 during their movement from the position shown in FIGURE 4 to the position shown in FIGURE 5.

If the mass of the bars 14 and the billets B being lifted thereby is not balanced about the points at which the lever ends 20 have camming engagement with the bars 14, the bars 14 in such case will move upwardly with a tilting movement about the bell-crank lever ends 20. For example, and assuming an unbalance such that the ends of the bar 14, at the right as viewed in FIGURE 4, do not move upwardly in the slots 16, then rotation of the lever ends 20 will cause the other ends of the bars 14 to move upwardly to positions limited by the upper ends of the slots 17. When the bars 14 engage the upper ends of the slots 17, further rotation of the lever ends 20 will force the other ends of the bars 14 upwardly in the slots 16 to the positions shown in FIGURE 5, in which position both ends of the bars 14 will have their upward movement limited by engagement with the upper ends of both of the slots 16 and 17.

After operation of the lift motor 23, the motor 30 is operated to move the bars 14 horizontally and to move each billet B to the position shown in FIGURE 6 in which a lower corner thereof is positioned over an adjacent turning land 12. In order to provide for subsequent rotation of the billets B in a manner to be described, the horizontal movement of the bars 14 must be regulated to position the billets with less than one-half of their lower sides over the turning lands 12. While this can be accomplished by operation of the control valve 37, stops (not shown) may be provided for limiting the forward movement of the bars 14 according to the size of the billets being handled.

After the billets are located over the turning lands 12, the lift motor 23 is operated in a reverse direction to rotate the levers 18 in a clockwise direction from the position shown in FIG. 6 and to lower the bars 14 and the billets B supported thereby. As the billets B move downwardly to the position shown in FIG. 7, they engage the turning lands 12 which operate to continue the billet rotation in a counterclockwise direction as they return to a supported position in the notches 9 as shown in FIGURE 4. This places the surfaces $y$ in the position previously occupied by the surfaces $x$ for inspection and scarfing by an operator. These operations are repeated until each side of the billet has been inspected and scarfed after which they are removed from the support 1 by a fork lift truck.

In the preferred operation of the apparatus as described above, the billets are inspected and scarfed with their surfaces $x$ inclined downwardly in a direction away from an operator on the platform 3 and at an angle of approximately 30° with reference to a horizontal plane as shown in FIGURE 4. However, and with reference to FIGURE 5 of the drawings, it will be apparent that the apparatus provides for holding the billets B with their surfaces $x$ in a horizontal plane. Inspection and scarfing of the surfaces $x$ may of course be effected while the billets B are supported on the bars 14 in the position shown in FIGURE 5.

While the drawings show the preferred arrangement of the billet supporting notches 9 in the upper edges of the side slabs 4 and 5, it will be understood that apparatus embodying the billet turning principles of this invention may be provided by providing the notches 9 in the upper edges of the side bars 14. In such case, the upper edges of the side slabs 4 and 5 would be level and would operate to hold billets B with their surfaces $x$ in a horizontal plane, and to provide for inspection and scarfing with the billet surfaces $x$ in an inclined position, the side bars 14 would be maintained in an elevated position relative to the side slabs 4 and 5 with the billets B supported in the notches 9 therein.

To prevent the collection of molten scarfing metal on the operating mechanism, an apron or deflecting plate 48 is secured to the cross-bar 31 in a position depending downwardly therefrom as best shown in FIGURES 1 and 4. The plate 48 operates to deflect splashing metal into the space under the billets being scarfed. The side plates 4 and 5 are provided with openings 49 through which scrap metal formed by the scarfing operation may be removed from the apparatus.

In the preferred embodiment of the invention shown in FIGURES 1-7, a fork lift truck is operated to transfer billets over the upper ends 50 of the vertical extending legs 47 in the end slab 8 in moving the billets to and from a position supported on the side slabs 4 and 5. The modification shown in FIGURES 8 and 9 eliminates the necessity of using a fork lift truck for this purpose and enables loading and unloading of billets on the side slabs 4 and 5 by operation of the side bars 14. In this showing, the side bars 14 are provided with wear plates 51 which are welded on their facing surfaces, and have a vertical dimension less than the height of the side bars 14 for a purpose to be described. The horizontal and vertical movement of each side bar 14 and attached wear plate 51 is guided by a pair of spaced vertically extending guides 52 and 53 on each of the ends of the end slab 8 which provide spaces 54 in which the ends of the side bars 14 have a guided sliding movement. To limit vertical movement of the bars 14 in the spaces 54, each guide 53 is formed with a shoulder 55 for abutting engagement with the top of a wear plate 51. The shoulders 55 are positioned below the upper surface 56 of the guide members 53 a distance such that the upper surface 57 of the side bars 14 project above the surfaces 56 when they are moved to their upper position as shown in FIGURE 9. In this position, horizontal movement of the side bars 14 by the motor 30 may be employed to move billets B to and from a position over the notches 9 in the side slabs 4 and 5. This modification enables the side bars 14 to transfer billets to and from a position on a support (not shown) at the right of the end slab 8 as viewed in FIGURE 9.

While the above description and accompanying drawings disclose a preferred embodiment and a modification of the invention, it will be understood that other adaptations and changes may be made within the scope of the following claim.

I claim:

A billet turning apparatus comprising a pair of laterally spaced supporting members respectively having horizontal upper edges with a series of notches at spaced intervals along the length thereof, said notches being arranged in laterally aligned pairs in which billets are received and supported on said members in parallel positions, each of said notches comprising a pair of angularly inclined surfaces for engagement with two sides of a billet supported therein, the angular inclination of each of said pair of surfaces being such that the top side of each of the billets supported in said notches is inclined downwardly at an angle of less than 45° relative to a horizontal plane, a billet handling carriage mounted for vertical movement and horizontal movement relative to said supporting members and normally occupying a retracted position under the billets supported thereon, means for raising and lowering said carriage to remove and return billets with respect to their supported positions on said members, said carriage having a flat horizontal surface to which the billets are transferred upon upward movement and in being transferred thereto are rotated in one direction through said angle, said supporting members having billet turning lands arranged at one side of each of said notches, means for shifting said carriage horizontally in a direction lengthwise of said supporting members, said carriage horizontal shifting means being operable after actuation of said carriage vertically to lift billets out of said notches for moving such billets to positions in which one of their lower corners are arranged over said turning lands, said turning lands being effective upon subsequent lowering operation of said carriage to engage and continue the rotation of said billets through an angle of 90° as they are returned to positions supported in said notches.

References Cited in the file of this patent

UNITED STATES PATENTS

| | | |
|---|---|---|
| 1,486,984 | McKee | Mar. 18, 1924 |
| 1,965,868 | Vickers | July 10, 1934 |
| 2,744,639 | Evans | May 8, 1956 |
| 2,837,200 | Evans | June 3, 1958 |

FOREIGN PATENTS

| | | |
|---|---|---|
| 634,386 | Germany | Aug. 26, 1936 |